Figure 1:
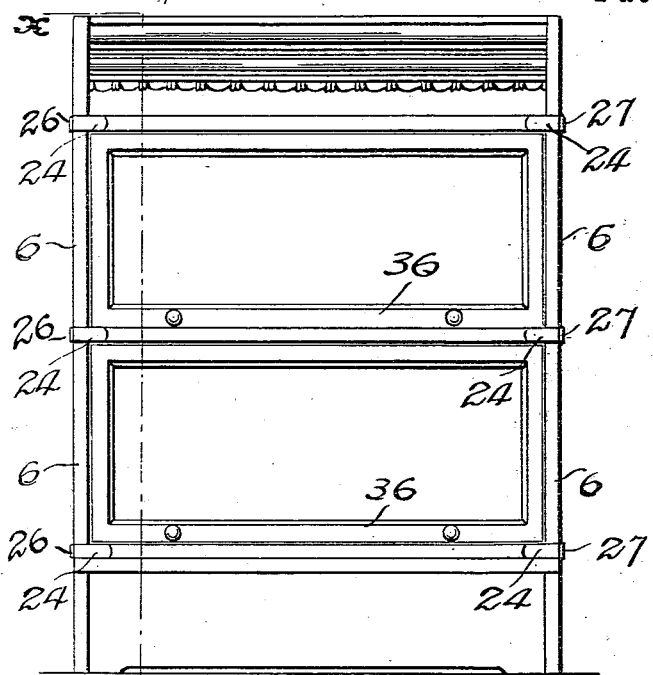

(No Model.) 4 Sheets—Sheet 1.

O. H. L. WERNICKE.
SECTIONAL BOOKCASE.

No. 557,737. Patented Apr. 7, 1896.

Witnesses:
C. E. Van Doren
F. S. Lyon

Inventor,
Otto H. L. Wernicke.
By Paul A. Hawley
his Att'y.

ANDREW B. GRAHAM, PHOTO-LITHO, WASHINGTON, D.C.

(No Model.) 4 Sheets—Sheet 2.
O. H. L. WERNICKE.
SECTIONAL BOOKCASE.
No. 557,737. Patented Apr. 7, 1896.
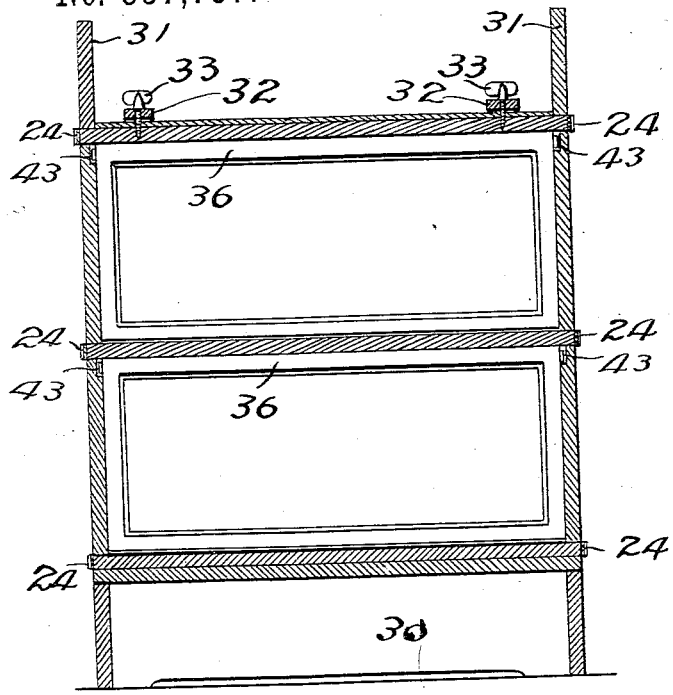
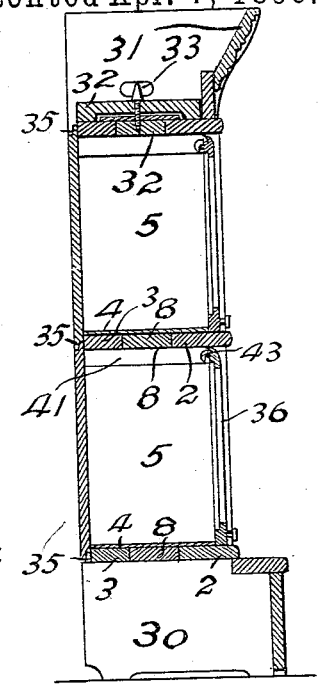
Fig. 7.
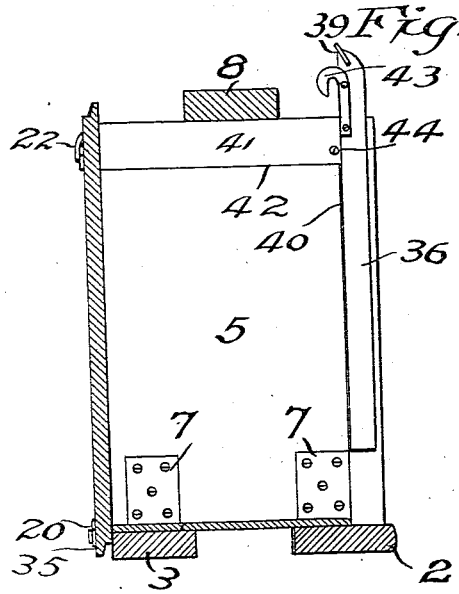
Fig. 9.
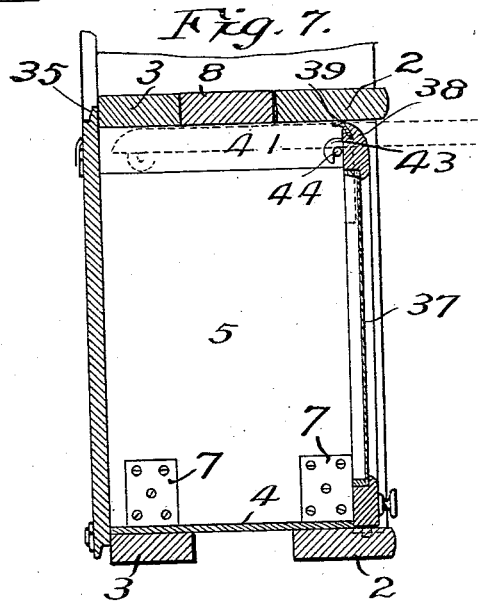
Fig. 10.
Witnesses;
O. E. Van Doren.
F. S. Lyon.
Inventor;
Otto H. L. Wernicke.
By Paul A. Hawley
his Atty.

(No Model.) 4 Sheets—Sheet 3.
O. H. L. WERNICKE.
SECTIONAL BOOKCASE.
No. 557,737. Patented Apr. 7, 1896.
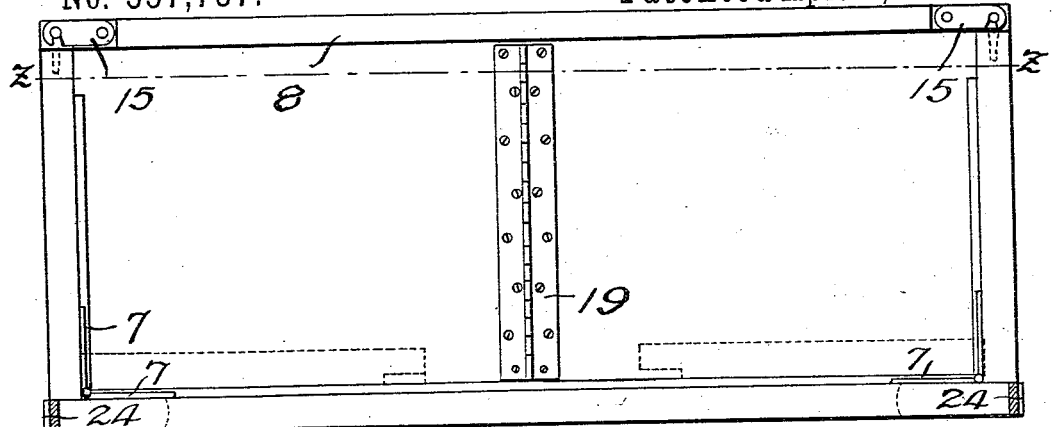
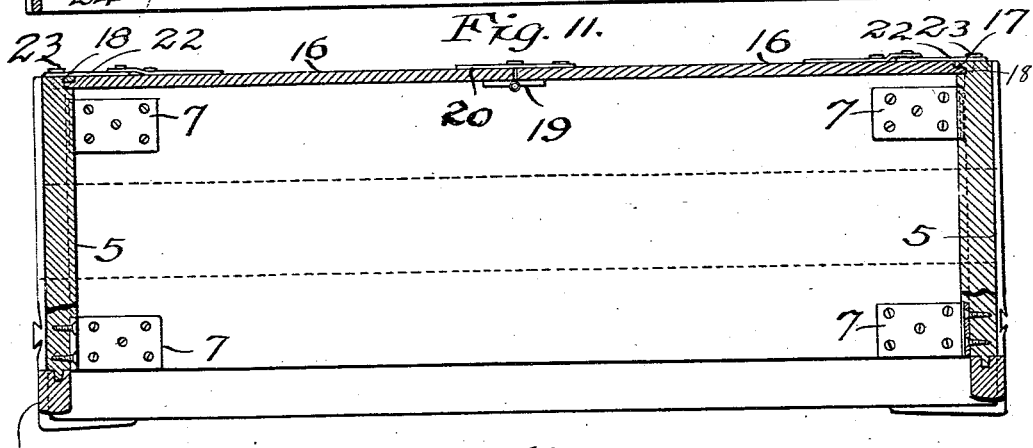
Fig. 11.
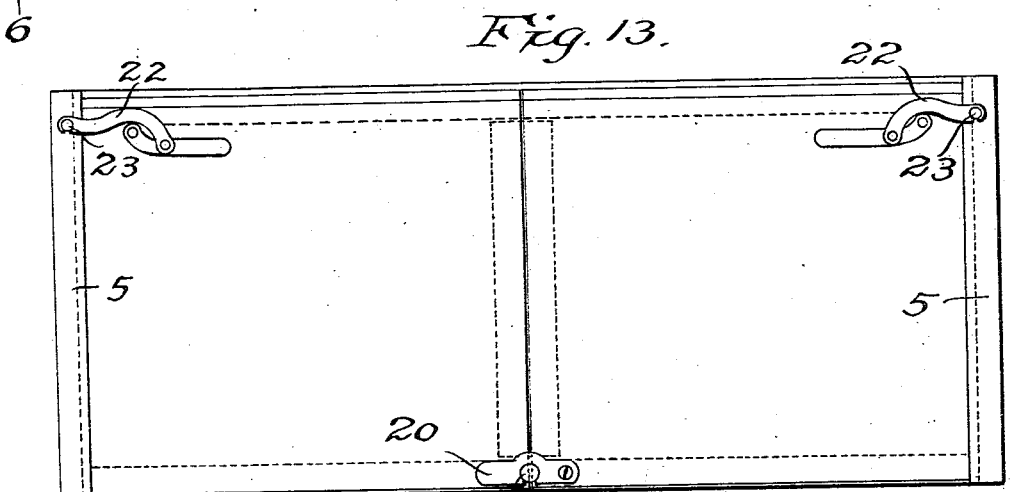
Fig. 13.
Fig. 12.
Witnesses:
C. E. Van Dorn.
F. S. Lyon
Inventor:
Otto H. L. Wernicke
By Paul O. Hawley
his Att'ys.
ANDREW B. GRAHAM, PHOTO-LITHO, WASHINGTON, D.C.

(No Model.) 4 Sheets—Sheet 4.
O. H. L. WERNICKE.
SECTIONAL BOOKCASE.
No. 557,737. Patented Apr. 7, 1896.
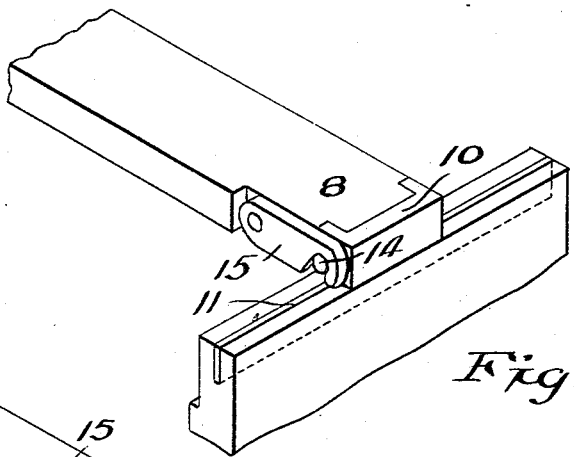
Fig. 15.
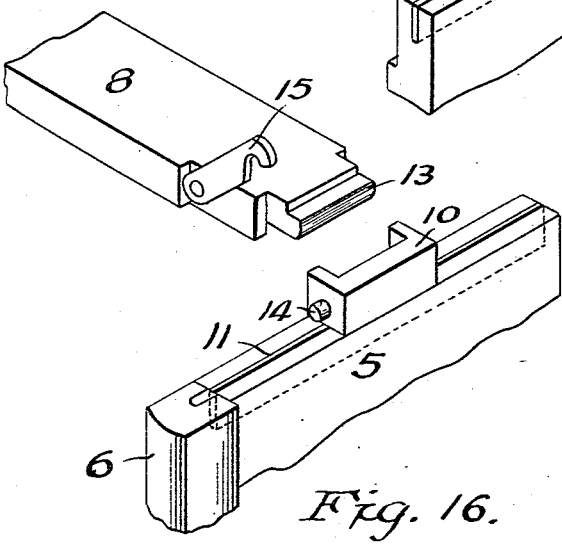
Fig. 16.
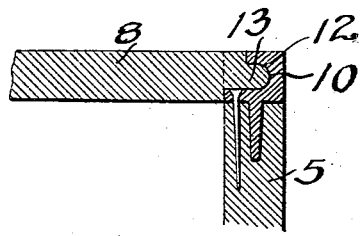
Fig. 17.
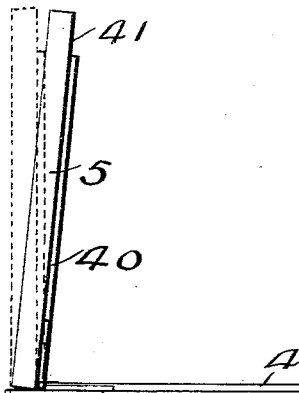
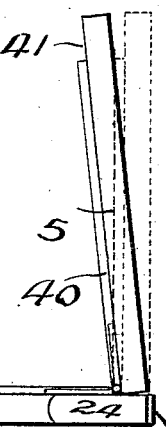
Fig. 14.
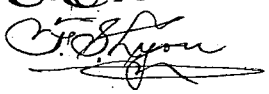
Witnesses:
C. E. Van Dorn
F. S. Lyon
Inventor:
Otto H. L. Wernicke.
By Paul O. Hawley
his Att'ys.
ANDREW B.GRAHAM. PHOTO-LITHO.WASHINGTON.D.C.

UNITED STATES PATENT OFFICE.

OTTO H. L. WERNICKE, OF MINNEAPOLIS, MINNESOTA, ASSIGNOR TO THE WERNICKE CO., OF SAME PLACE.

SECTIONAL BOOKCASE.

SPECIFICATION forming part of Letters Patent No. 557,737, dated April 7, 1896.

Application filed August 2, 1895. Serial No. 557,938. (No model.)

*To all whom it may concern:*

Be it known that I, OTTO H. L. WERNICKE, of the city of Minneapolis, county of Hennepin, State of Minnesota, have invented certain new and useful Improvements in Sectional Bookcases, of which the following is a specification.

My invention relates to sectional bookcases, and, further, to a bookcase of a construction which adapts each section to be collapsed, so that it may be shipped in a substantially knocked-down condition, while at the same time the construction is such that the case may be readily assembled and erected by any person receiving the same.

The particular object of my invention is to provide a collapsible case in which the parts will be few and for the most part permanently secured together, although some of the features of the case are applicable to sectional cases that are not collapsible.

To these ends my invention consists generally in a bookcase comprising a number of interchangeable sections, preferably of an interlocking form, each section being provided with hinged ends adapted to be raised to vertical positions, so that the top may be secured thereon, and a jointed back adapted to be swung into place between the ends.

The invention consists, further, in a particular construction and arrangement for the door of the case or section, in the particular construction of the backs of the several sections, and in further details of construction and in combinations of parts, all as hereinafter described, and particularly pointed out in the claims.

The invention will be more readily understood by reference to the accompanying drawings, forming part of this specification, and in which—

Figure 2:
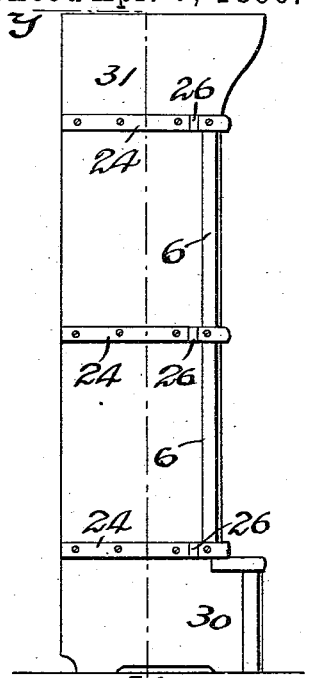
Figure 4:
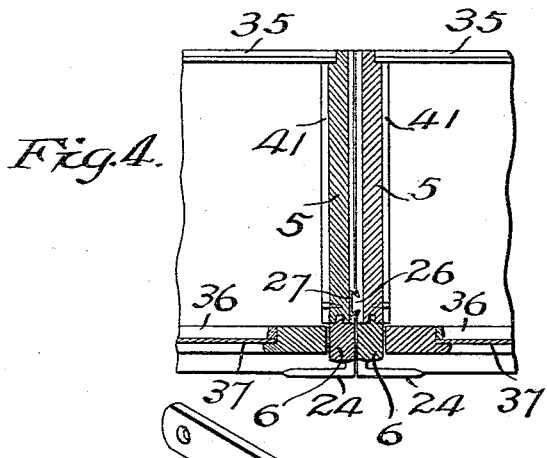
Figure 5:
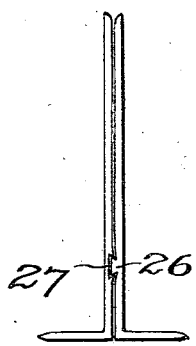
Figure 3:
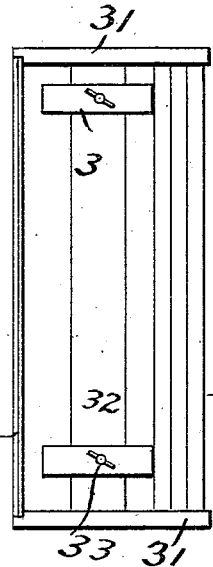
Figure 6:
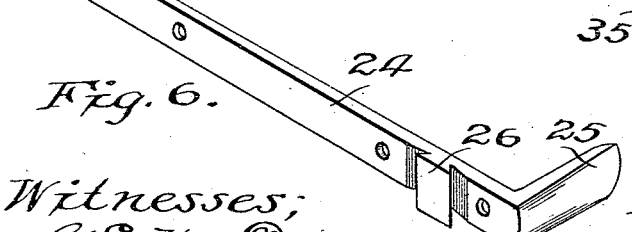

Figure 1 is a front view of a two-section non-collapsible bookcase embodying features of my invention. Fig. 2 is an end view thereof. Fig. 3 is a top view of the same. Fig. 4 is an enlarged horizontal section showing the abutting ends of adjacent sections of boxes and the means for securing them together and at the same time finishing the corners of the section. Fig. 5 illustrates the two finishing-irons. Fig. 6 is a perspective view of a single iron or metal strip. Fig. 7 is a vertical transverse section on the line *x x* of Fig. 1. Fig. 8 is a longitudinal vertical section on the line *y y* of Fig. 2. Fig. 9 is a transverse vertical section, enlarged, showing a single collapsible section, the door being slightly raised to show the manner of placing the same. Fig. 10 is a similar sectional view showing the door in place and showing a tight joint made between the upper edge of the door and the next section above. Fig. 11 is a front view of a collapsible section. Fig. 12 is a back view thereof. Fig. 13 is a horizontal sectional view of the same on the line *z z* of Fig. 11. Fig. 14 illustrates the bottoms of the two ends of the collapsible section as they appear before the back and top rail are placed in position. Fig. 15 is an enlarged perspective detail showing the means for securing the top rail or board upon the ends. Fig. 16 is a similar view showing the top rail removed from the end of the section. Fig. 17 is a vertical sectional view taken through the metal joint or coupling between the top rail and end.

As shown in the drawings, this bookcase is made up in sections which may be individually collapsible, each collapsible section being adapted to be taken apart, in a measure, so that it may be packed within a very small space. While this collapsible construction forms a substantial part of my present invention, I have shown in Figs. 1 to 7, inclusive, a construction that is non-collapsible, and many of the features of the invention may be used whether the individual sections be collapsible or not.

The construction of a single collapsible section may be best understood from the cross-section views, Figs. 9 and 10, taken in connection with the elevation, Fig. 11, and horizontal section, Fig. 13. The bottom of the section, which is of a crate-like form, is made up of the two strips or boards 2 and 3, upon the tops of which a thin bottom board 4 is secured. The ends 5, complete in themselves, each form the finishing-strip 6, and their forward edges are secured to the bottom strips 2 and 3 by hinges 7, which, in the construction of the case, are placed so that the ends cannot be raised to an exactly perpendicular position without exerting some little force to swing them outwardly. This force exerts pressure on the bottom of the case, which tends to hold the middle of the same upward to prevent it sagging with the weight of the books. Further pressure of the ends toward one another aids in holding the back in place, as will be hereinafter described.

The top of the section comprises the single strip or board 8, having its ends secured upon the top of the ends 5, this strip being so fastened that it may be readily removed to permit the ends to be folded down. The fastening employed is one which will prevent the board from pulling away from the ends, and at the same time such that the board 8 will tie the end sections 5 together. This fastening comprises the socket-casting 10, preferably provided with a thin web 11 on its lower surface, which web may be the length of the end 5, and being arranged in the saw-cut in the top of the part 5 will prevent the end from warping.

Any suitable means may be used to secure the socket part 10 in place—as, for instance, nails, which pass down through the same into the end 5. As shown in Fig. 17, this socket-casting is provided with the recess 12 to admit the end 13 of the board 8, and on the end of the part 10 is a lug 14, with which a hook 15 on the part 8 will engage to tie the parts together. The end of the board 8 projects beneath the upper part of the casting 10, so that when put together a case may be lifted by the top strip or board 8.

The back of the case comprises the two sections or thin boards 16, having the tongues 17 on their ends, which tongues are adapted to enter vertical grooves 18 in the rear part of the ends 5. The parts 16 are secured at the middle by a hinge 19, so that the back practically forms a toggle-lever, which may be sprung into place between the ends against the pressure which the said ends naturally exert through the arrangement of the hinges and the strength of the bottom of the case. The back is sprung past its center, and, furthermore, is secured at the bottom of the case by a strap-hook 20, adapted to engage the head of a screw or pin 21, extending through into the bottom strip 3. In addition to this the ends 5 are drawn snugly against the ends of the back by the latches 22, which have a cam or eccentric action, as indicated in Fig. 12. These latches comprise the simple levers shown, the outer lever having the hook end to engage a pin or screw 23 in the rear edge of the part 5. When erected in this form, the case is quite as solid as if its parts were secured by glue and nails, while upon unfastening the few hooks the parts may be readily folded or collapsed. It will be seen that when such cases are duplicated and placed one above the other, the top slat or board 8 in each case will enter in the top between the two bottom slats or boards of the case above it. In this way the bottom or partition between two sections is made of a single thickness of board and at the same time the sections are locked firmly together.

To prevent longitudinal movement of one section upon another and to form a finish for the end of the section, I employ the metal strips 24. (Shown best in Figs. 4, 5, and 6.) The main portion of each strip 24 is fitted to extend along the bottom edge of the section to cover the opening between the bottom slats and engage the ends of the top slat of an overlying section. The strip 24 has an end 25, which turns the corner of the case and finishes it neatly, and in addition the two strips upon the case are provided one with a dovetailed tenon 26 and the other with a dovetailed slot 27, by means of which longitudinally-adjoining sections may be locked together, as shown in Fig. 4. Such a device is absolutely required in a large bookcase which is made up of several tiers of sections. This construction is preferably used whether the sections be collapsible or not.

The sections may be arranged one upon the other to any convenient height and the lower one rests upon the base 30, the top of which is preferably constructed in a manner similar to the top of one of the cases of sections. The cornice 31 is of a similar construction, and in any case I prefer to provide the cross-strips 32 in the top of the cornice (see Figs. 3, 7, and 8) in order that a thumb-screw may be screwed down through the cross-strip of the last or upper case, whereby the cornice is prevented from warping out of shape, and the sections are also prevented from twisting out of position.

It will be noticed that the backs of the cases are provided with tongues 35 on both upper and lower edges, the upper-edge tongue lapping behind the tongue of the lower edge of the case above. The case is in this way made practically dustproof.

One of the particular difficulties which have been experienced in devising this case has been to procure a proper form of door by which dust could be excluded, while a neat appearance might be retained. For this purpose I provide a door comprising a simple frame 36, adapted to contain a pane of glass 37, and having around it an upper edge 38, in the rear edge of which is a felt strip 39, adapted to engage the bottom of the next case or section. The ends of the section are provided with shoulders 40, against which this door is adapted to close when it is swung down, and in the upper parts of the ends are grooves 41, by which shoulders 42 are made, upon which the door may rest when it is raised and shoved inwardly. When down, the lower edge of the door will engage the thin bottom 4 of the case. The door is provided with the metal hooks 43, and in the grooves 41 are pins 44, about which the door is adapted to pivot. When the door is drawn out, it will pivot upon these pins, and when dropped will swing down and close the front of the case. When raised into a horizontal position, the door may be pushed back, the hooks 43 sliding upon the shoulders 42 in the ends of the case, while the main body of the door will slide over the pins 44 and be supported thereby. The felt strip 39 in the upper edge of the door engages the bottom of the upper case or section before the door is completely closed, so that the only exit for the air within the section is through the opening beneath the edge of the door. As a result, the door completes a practical bellows, and the air will be forced out so quickly as to carry all dust with it. While simply incidental to the construction, this feature of my device has proven of particular advantage and importance. When the upper case is removed, the door may be slipped up, as shown in Fig. 9, disengaged from the pins, and removed. This feature of my invention may also be used either upon collapsible or non-collapsible sections and the same advantages secured in either case.

I do not limit myself to the details of construction, as the same may be varied in many particulars without departing from my invention.

Having thus described my invention, I claim as new and desire to secure by Letters Patent—

1. A bookcase-section, comprising a suitable bottom, ends hinged thereto and adapted to be folded down upon the bottom, a removable back and top, and a door hinged at its upper edge to said ends and adapted to be swung down and cover the front of said case, and to be turned into a horizontal position and be pushed back under said top.

2. A bookcase, composed of interlocking collapsible sections or boxes, each of said sections being provided with a door hinged at its upper edge to the ends of the section and capable of being turned to a horizontal position and being pushed back beneath the top of the section the ends of the sections being provided with shoulders 42 upon which the doors are supported when pushed back beneath the top.

3. A bookcase composed of interlocking sections or boxes, each section being provided with hinged ends capable of folding over the bottom, and with a removable top and back, and a door hinged at its upper edge to said ends and capable of being turned to a horizontal position and being pushed back beneath the top of the section.

4. The combination, in a bookcase, of a series of collapsible sections or boxes, and means for locking the ends, top, and bottom of each box to the ends, bottom, and top of the adjacent boxes.

5. A bookcase, composed of separable sections having ends adapted to fold down over the bottom thereof, and removable backs and tops, each back being adapted to be folded longitudinally, and having ends to engage grooves in the edges of said folding end, whereby the same will be held in an upright position, a door supported by said ends in the upper part of said section, and adapted when drawn forward to swing down and cover the front thereof, substantially as described.

6. A bookcase comprising one or more sections, each having folding ends, and a longitudinally-folding back, said back being also removable, and adapted when in place to hold said ends in an upright position, and in turn to be held in an upright position, and to be held in place by them, substantially as described.

7. A bookcase comprising a series of sections, the ends of each section being pivoted to the bottom thereof to fold down over the same, and each section having a removable back adapted when in place to hold said ends in an upright position and means for locking said ends and back together, substantially as described.

8. A bookcase comprising one or more sections, each having folding ends and a longitudinally-folding back, said back being also removable and adapted when in place to hold said ends in an upright position, and in turn to be held in place by them, and a door arranged in the upper part of said sections and adapted when drawn forward to cover the front thereof, substantially as described.

9. A bookcase comprising a series of interlocking sections, each having folding ends and a removable back and top, the ends of said back being arranged to engage grooves in the edge of said folding ends, whereby the same will be held in an upright position, and the latches for locking said back ends together, substantially as described.

10. A bookcase composed of a series of sections each comprising the bottom strips 2 and 3, the thin sheathing 4, the ends hinged thereto, the removable back arranged to hold said ends in an upright position, the door supported by said ends, and arranged to slide in the upper part of said section, and provided with the hooks 43 to engage the pins 44 in said ends, the part 8 connecting the top of said folding ends, the blocks 10 carried by said ends to receive the ends of said part 8, and means for locking said blocks 10 and parts 8 together, substantially as described.

11. A bookcase, comprising a series of interlocking sections, having folding ends and backs and a removable top, the back of each section being arranged when in place to hold the folding ends in an upright position, the sliding doors arranged in the upper part of said sections, the strips 24 secured to the abutting ends thereof, each alternate strip being provided with the tenons 26 to enter similar-shaped grooves in the adjoining strip, thereby locking the two sections together, substantially as described.

12. A bookcase comprising a series of separable sections placed one above the other, the ends of the longitudinally-adjoining sections being provided with the strips 24 having the ends 25, and the alternate strips being provided with a dovetailed tenon 26 to engage a similar-shaped slot in the strip provided in the end of the abutting section, substantially as described.

13. A bookcase comprising a series of sections, each having folding ends, and a removable back, each end being provided with a block 10, having a pin 14, the strip 8 having the ends 13 to fit into said block, and the hooks 15 to engage said pins for the purpose set forth.

14. A bookcase comprising one or more sections having ends pivoted to the bottom thereof, and removable backs arranged to hold said ends in an upright position, and said ends being adapted when raised to an upright position to spring up the central portion of said bottom for the purpose set forth.

15. A bookcase comprising a series of sections, the ends of said sections being provided with the grooves 42 and the shoulders 40, the door arranged to slide upon the shoulders formed by said grooves, the pins 44, the hooks 43 for engaging the same and said door being provided on its inner edge with the felt 39, for the purpose set forth.

16. A bookcase comprising a series of separable sections adapted to be placed one above the other, the ends, top, and bottom of each section being provided with interlocking devices adapted to engage corresponding devices in the ends, bottom, and top of the adjacent sections.

17. A bookcase-section, having its bottom formed of the longitudinal strips 2 and 3, and the plate 4 arranged over said strips, in combination with a similar section having at its top a longitudinal strip 8 adapted to fit into the space between said strips 2 and 3 and below said plate 4.

18. A bookcase-section having its bottom provided with the two strips 2 and 3, and provided with finishing-strips 24 extending across the ends of the strips 2 and 3.

19. A bookcase-section, having its bottom provided with the two strips 2 and 3, having a space between them to receive the top strip of a similar section, and the finishing-strips 24 extending across the ends of said strips 2 and 3, and provided with means for interlocking with similar strips upon the ends of abutting sections.

20. A bookcase-section provided at the lower part of each end with a finishing-strip extending from the front to the rear of the section and having a projection or recess adapted to interlock with a corresponding recess or projection upon the end of an abutting section.

In testimony whereof I have hereunto set my hand this 22d day of June, A. D. 1895.

OTTO H. L. WERNICKE.

In presence of—
C. G. HAWLEY,
FREDERICK S. LYON.